(12) United States Patent
Kim et al.

(10) Patent No.: US 8,200,233 B2
(45) Date of Patent: Jun. 12, 2012

(54) APPARATUS AND METHOD FOR SUPPORTING CELLS WITH DIFFERENT CHARACTERISTICS IN A BROADBAND WIRELESS COMMUNICATION SYSTEM

(75) Inventors: Yung-Soo Kim, Seongnam-si (KR); Ju-Mi Lee, Seoul (KR)

(73) Assignee: Samsung Electronics Co., Ltd., Seoul (KR)

( * ) Notice: Subject to any disclaimer, the term of this patent is extended or adjusted under 35 U.S.C. 154(b) by 820 days.

(21) Appl. No.: 12/284,102

(22) Filed: Sep. 18, 2008

(65) Prior Publication Data

US 2009/0082002 A1 Mar. 26, 2009

(30) Foreign Application Priority Data

Sep. 21, 2007 (KR) .................. 10-2007-0096480
Jan. 14, 2008 (KR) .................. 10-2008-0003783

(51) Int. Cl.
*H04W 40/00* (2009.01)

(52) U.S. Cl. ........................ 455/448; 455/444

(58) Field of Classification Search .......... 455/448, 455/435.2, 443, 444.449, 507, 456.1–456.6, 455/11.1, 41.1, 41.2, 524, 424, 443.1; 370/338, 370/470, 343, 344, 203, 208, 334, 108

See application file for complete search history.

(56) References Cited

U.S. PATENT DOCUMENTS

| | | | | |
|---|---|---|---|---|
| 7,512,409 | B1 * | 3/2009 | Hadad | 455/502 |
| 2005/0153692 | A1 * | 7/2005 | Hwang et al. | 455/434 |
| 2005/0288021 | A1 * | 12/2005 | Hunkeler | 455/436 |
| 2008/0043879 | A1 * | 2/2008 | Gorokhov et al. | 375/296 |
| 2008/0186950 | A1 * | 8/2008 | Zhu et al. | 370/350 |

* cited by examiner

*Primary Examiner* — Jean Gelin
*Assistant Examiner* — Michael Nguyen

(57) ABSTRACT

An apparatus and method for supporting cells with different characteristics in a wireless communication system are provided. To operate for communications in a frame divided into a first part of a system common signal structure and a second part of a communication environment-dependent signal structure in a wireless communication system in which cells co-exist under different communication environments, a BS generates physical configuration information about a signal of the second part, transmits the physical configuration information about the signal of the second part in the first part, and conducts communications by processing signals transmitted and received in the second part according to the physical configuration information.

22 Claims, 9 Drawing Sheets

APPARATUS AND METHOD FOR SUPPORTING CELLS WITH DIFFERENT CHARACTERISTICS IN A BROADBAND WIRELESS COMMUNICATION SYSTEM

CROSS-REFERENCE TO RELATED APPLICATION(S) AND CLAIM OF PRIORITY

This application claims the benefit under 35 U.S.C. §119(a) of a Korean Patent Application filed in the Korean Intellectual Property Office on Sep. 21, 2007 and assigned Serial No. 2007-96480 and a Korean Patent Application filed in the Korean Intellectual Property Office on Jan. 14, 2008 and assigned Serial No. 2008-3783, the entire disclosures of which are hereby incorporated by reference.

TECHNICAL FIELD OF THE INVENTION

The present invention generally relates to a broadband wireless communication system. More particularly, the present invention relates to an apparatus and method for supporting cells with different characteristics in a broadband wireless communication system.

BACKGROUND OF THE INVENTION

An outdoor mobile communication environment and an indoor short-range communication environment are under very different conditions. Hence, different systems support communications in these environments. For example, Global System for Mobile telecommunication (GSM), Interim Standard-95 (IS-95), Wideband Code Division Multiple Access (WCDMA), and Code Division Multiple Access-2000 (CDMA-2000) were developed for outdoor communications, whereas Institute of Electrical and Electronics Engineers (IEEE) 802.11a, IEEE 802.11b, and Wireless Fidelity (WiFi) were developed for indoor communications.

Along with user demands for more various and more complex services, future-generation communication systems should be able to provide diverse services including voice and data simultaneously in an integrated fashion irrespective of place, indoor or outdoor. To meet those demands, the present separate communication systems for indoor use and outdoor use can be integrated into a single system, but with the following drawbacks.

(1) Interworking is complex and a processing delay occurs between the two systems. Although technologies such as Media Independent Handover (MIH) have been developed for vertical handover to solve the problems, they still require complex protocols and procedures.

(2) Since the two systems use different frequency bands, flexible frequency use is difficult. For instance, a WiFi system uses an unlicensed band and a legacy mobile communication uses a dedicated licensed band. Accordingly, it is difficult to use a licensed band for an indoor communication system.

(3) A user terminal should be equipped with a function of using the two systems. Therefore, the implementation complexity of the terminal increases.

As described above, the convergence between different systems aiming at integrated provisioning of different services including voice and data indoors or outdoors faces many problems. Accordingly, there exists a need for an effective technique for supporting cells with different characteristics in order to meet more diverse and more complex user demands.

SUMMARY OF THE INVENTION

To address the above-discussed deficiencies of the prior art, it is a primary object of the present invention to address at least the problems and/or disadvantages and to provide at least the advantages described below. Accordingly, an aspect of exemplary embodiments of the present invention is to provide an apparatus and method for supporting cells with different characteristics in a broadband wireless communication system.

Another aspect of exemplary embodiments of the present invention provides an apparatus and method for using a super-frame structure that is divided into a first part of a common structure and a second part of a communication environment-dependent structure in a broadband wireless communication system.

A third aspect of exemplary embodiments of the present invention provides an apparatus and method for transmitting information about the signal configuration of a second part by a first part in a broadband wireless communication system.

A fourth aspect of exemplary embodiments of the present invention provides an apparatus and method for transmitting information about the signal configuration of a second part existing in a different frequency band by a first part in a broadband wireless communication system.

A fifth aspect of exemplary embodiments of the present invention provides an apparatus and method for transmitting signal configuration information by a first part, for use in communications in a different frequency band in a broadband wireless communication system.

A sixth aspect of exemplary embodiments of the present invention provides an apparatus and method for transmitting information about the signal configuration and physical position of a Peer-to-Peer (P2P) communication resource area of a second part by a first part to enable P2P communications in the second part in a broadband wireless communication system.

A seventh aspect of exemplary embodiments of the present invention provides an apparatus and method for transmitting information about the signal configuration and physical position of a relay communication resource area of a second part by a first part to enable relay communications in the second part in a broadband wireless communication system.

An eighth aspect of exemplary embodiments of the present invention provides an apparatus and method for indicating information about the signal configurations and physical positions of communication performance improving technology resource areas of a second part by a first part to enable implementation of the communication performance improving technologies in the second part in a broadband wireless communication system.

A ninth aspect of exemplary embodiments of the present invention provides an apparatus and method for transmitting information about the physical position of a resource area in which a mobile station (MS) not compliant with the present invention communicates in a second part by a first part to enable the MS to communicate in the second part in a broadband wireless communication system.

A tenth aspect of exemplary embodiments of the present invention provides an apparatus and method for synchronizing base stations (BSs) of cells under different communication environments in a broadband wireless communication system.

An eleventh aspect of exemplary embodiments of the present invention provides an apparatus and method for measuring interference between BSs of cells under different communication environments in a broadband wireless communication system.

A twelfth aspect of exemplary embodiments of the present invention provides an apparatus and method for providing handover information in a BS of a cell included in a cell of another BS in a broadband wireless communication system.

In accordance with an aspect of exemplary embodiments of the present invention, there is provided an operation method of a BS for communicating in a frame divided into a first part of a system common signal structure and a second part of a communication environment-dependent signal structure in a broadband wireless communication system in which cells co-exist under different communication environments, in which physical configuration information about a signal of the second part is generated and transmitted in the first part, and communications are conducted by processing signals transmitted and received in the second part according to the physical configuration information.

In accordance with another aspect of exemplary embodiments of the present invention, there is provided an operation method of an MS for communicating in a frame divided into a first part of a system common signal structure and a second part of a communication environment-dependent signal structure in a broadband wireless communication system in which cells co-exist under different communication environments, in which physical configuration information about a signal of the second part is detected from the first part, and communications are conducted by processing signals transmitted and received in the second part according to the physical configuration information.

In accordance with a further aspect of exemplary embodiments of the present invention, there is provided an apparatus of a BS for communicating in a frame divided into a first part of a system common signal structure and a second part of a communication environment-dependent signal structure in a broadband wireless communication system in which cells co-exist under different communication environments, in which a system information generator generates physical configuration information about a signal of the second part, and a communication module transmits the physical configuration information about the signal of the second part in the first part and conducts communications by processing signals transmitted and received in the second part according to the physical configuration information.

In accordance with still another aspect of exemplary embodiments of the present invention, there is provided an apparatus of an MS for communicating in a frame divided into a first part of a system common signal structure and a second part of a communication environment-dependent signal structure in a broadband wireless communication system in which cells co-exist under different communication environments, in which a system information detector detects physical configuration information about a signal of the second part from the first part, and a communication module conducts communications by processing signals transmitted and received in the second part according to the physical configuration information.

In accordance with yet another aspect of exemplary embodiments of the present invention, there is provided a broadband wireless communication system having cells under different communication environments and using a frame divided into a first part of a system common signal structure and a second part of a communication environment-dependent signal structure, in which a first BS transmits physical configuration information about a signal of the second part in the first part, and conducts communications by processing signals transmitted and received in the second part according to a signal structure corresponding to a communication environment of the first BS, a second BS transmits physical configuration information about a signal of the second part in the first part, and conducts communications by processing signals transmitted and received in the second part according to a signal structure different from the signal structure of the first BS, and a first MS detects physical configuration information about a signal of the second part of the serving BS from the first part and communicates with the serving BS by processing a signal according to the detected physical configuration information.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior uses, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

Figure 1:
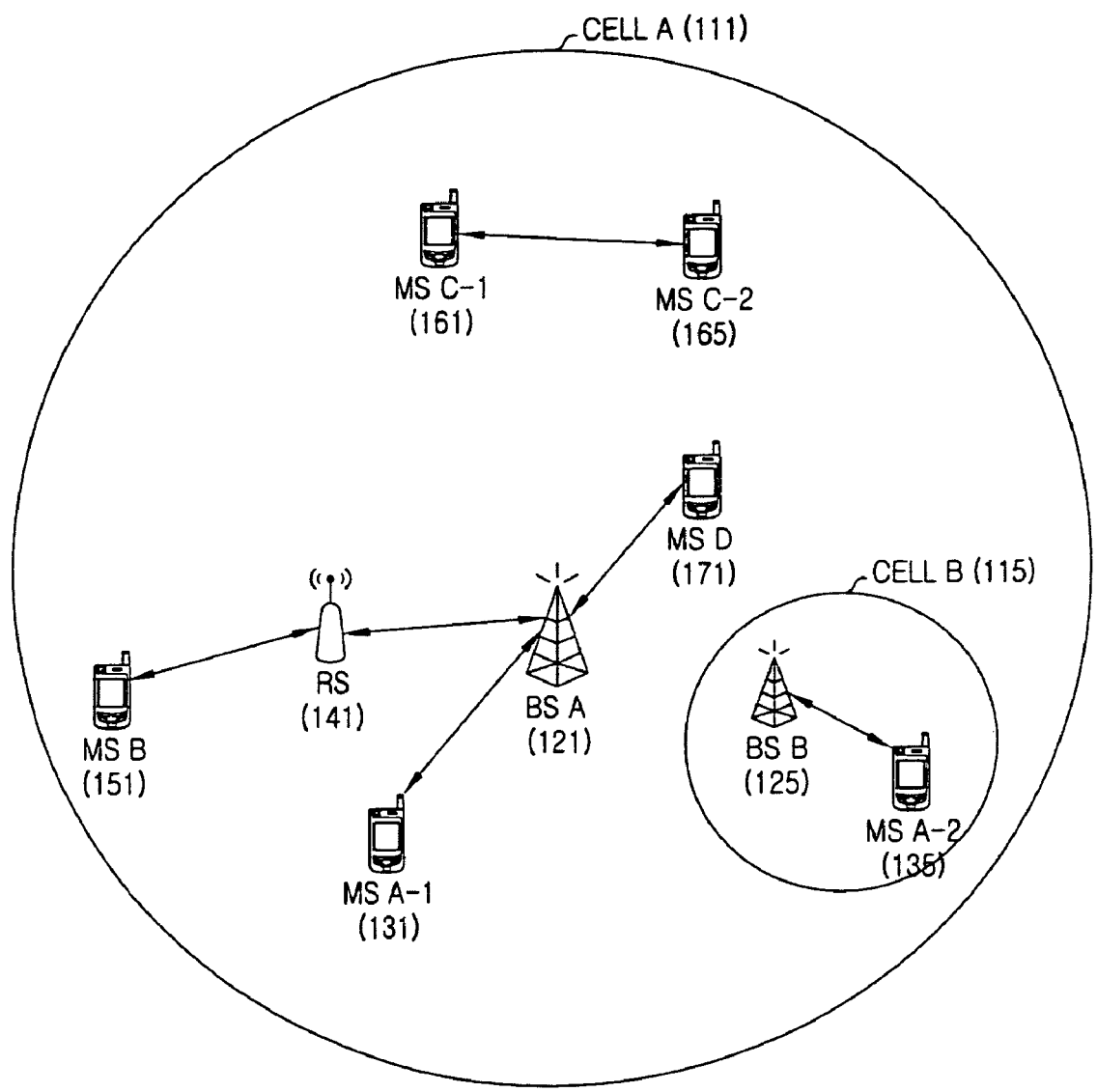
FIG. 1 illustrates a distribution of cells in a broadband wireless communication system according to an exemplary embodiment of the present invention.

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

The present invention is intended to provide a technique for supporting cells with different characteristics in a broadband wireless communication system. While the present invention will be described below in the context of an Orthogonal Frequency Division Multiplexing (OFDM) wireless communication system, it is also applicable to other wireless communication systems.

The present invention considers a cell with a broad coverage as Cell A 111 and a cell with a small coverage as Cell B 115. Cell A 111 serves outdoor mobile wireless communications and Cell B 115 serves indoor wireless communication or outdoor short-range wireless communications. While Cell A 111 and Cell B 115 each are singular in FIG. 1, it is for illustrative purposes. In real implementations, more cells may exist. Also, although only two types of cells, Cell A 111 and Cell B 115 are shown for the sake of convenience, cells with diverse sizes may co-exist in real implementations. The cells illustrated in FIG. 1 can be a macro cell, a micro cell, a pico cell, and a femto cell. Besides, these cells can be under other communication environments. Cell A 111 and Cell B 115 differ in many aspects of communication environment, including transmit power, multipath fading, mobility-incurred Doppler effects, and interference. For notational simplicity, the communication environments of Cell A 111 and Cell B 115 are referred to as 'outdoor mobile communication environment' and 'indoor short-range communication environment', respectively.

To support both the outdoor mobile communication environment and the indoor short-range communication environment, the wireless communication system of the present invention uses a superframe. The superframe is divided into a first part of a signal structure common to different communication environments and a second part of a different signal structure according to a communication environment. The first part carries a signal for synchronization between a BS and an MS, system information about a BS, synchronization and interworking between BSs, self-configuration, and interference management. The system information transmitted in the first part includes information about the physical position of a resource area in the second part supporting an MS that is inoperable according to the present invention, that is, an MS that is not capable of receiving the information transmitted in the first part, system information about communication performance improving technologies such as a relay communication technology for communications between a BS and an MS or between MSs, a multicarrier communication technology, and a P2P communication technology, and information about the physical positions of resource areas allocated for these technologies. The resource area supporting the MS that is inoperable according to the present invention is defined to maintain compatibility with standards other than the present invention.

An MS that complies with the present invention should receive a signal in the first part. Therefore, the signal transmitted in the first part is designed so robust that it can be received even in the worst communication environment. In an OFDM system, for example, a Cyclic Prefix (CP) length, a pilot pattern, and a synchronization signal are designed to be robust for the signal transmitted in the first part. The second part is used for transmission and reception of a user signal optimized for each communication environment, and control and management signals related to the user signal. The length of the superframe and the position and length of the first part are fixed according to system setting. However, the signal configuration of the second part varies depending on a communication environment. The first part can be called a 'superframe common part' and if the first part resides at the start of the superframe, it can be called a 'superframe preamble part'.

The MS can conduct communications in various manners using the information acquired from the first part. Referring to FIG. 1, each of a BS 121 (BS A), a BS 125 (BS B), and a Relay Station (RS) 141 broadcasts system information about a second part of a signal configuration depending on its communication environment, that is, information about the physical configuration about a signal transmitted in the second part by a first part. Since BS A and BS B are in different communication environments, second parts configured by BS A and BS B have different physical signal configurations. If BS A uses a plurality of Frequency Allocations (FAs), the physical signal configuration of the second part configured by BS A for some FAs may be identical to that of the second part configured by BS B. That is, BS A can apply different physical signal configurations for different FAs. Or BS A can apply the same physical signal configuration to all FAs. Although BS A and the RS 141 are under the same communication environment, they have the same or different physical signal configurations for their second parts. If the physical signal configurations are different, signals between BS A and the RS 141 have a different physical signal configuration from that of signals between the RS 141 and an MS. Hence, the RS 141 should support the two physical signal configurations for relay link and access link, respectively.

An MS 131 (MS A-1) acquires information about the physical signal configuration of the second part of BS A from the first part received from BS A and communicates with BS A in the second part. If BS A uses a plurality of FAs, MS A-1 acquires information about the physical signal configurations of the FAs for the second part and communicates with BS A in at least one of the FAs in the second part.

An MS 135 (MS A-2) acquires information about the physical signal configuration of the second part of BS B from the first part received from BS B and communicates with BS B in the second part. An MS 151 (MS B) acquires information about the physical signal configuration of the second part of the RS 141 and information about the physical position of a relay communication resource area in the second part from the first part received from the RS 141 and communicates with the RS 141 in the relay communication resource area of the second part.

MSs 161 and 165 (MS C-1 and MS C-2) acquire the information about the physical signal configuration of the second part of BS A, information about the physical position of a P2P communication resource area, and system information for P2P communications in the first part received from the BS A, and communicate with each other by P2P.

An MS 171 (MS D) does not operate according to the frame structure of the present invention. It communicates with BS A in the second part without acquiring information from the first part. To ensure this compatibility, BS A supports a signal structure compliant with a structure that MS D supports in a certain resource area of the second part and controls MS D to be confined to the certain resource area in the superframe.

Figure 2A:
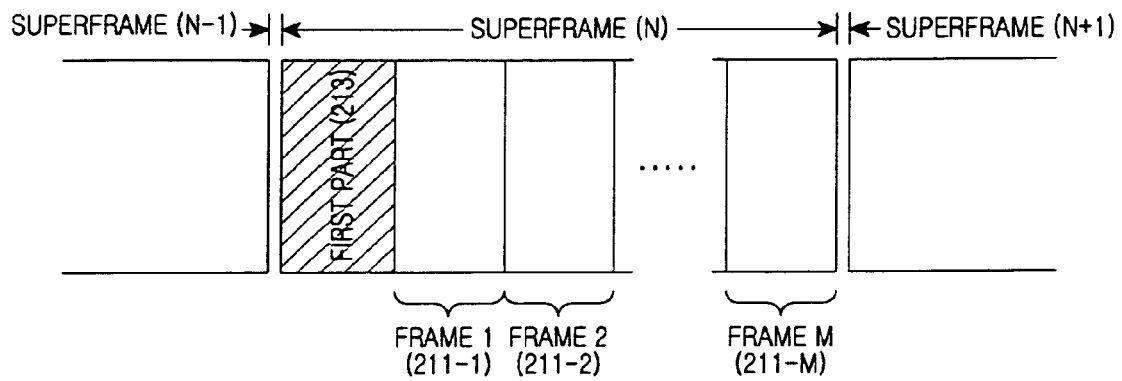
FIGS. 2A to 2C illustrate the structure of a superframe in the broadband wireless communication system according to an exemplary embodiment of the present invention.
Figure 2B:
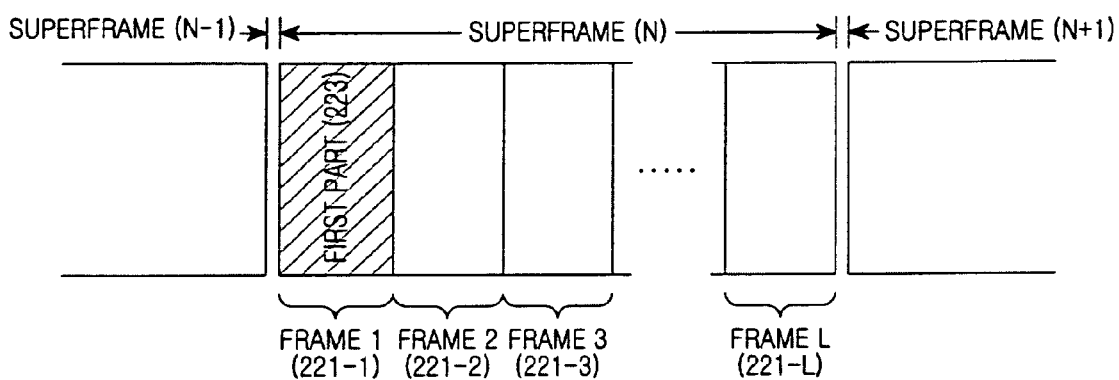
Figure 2C:
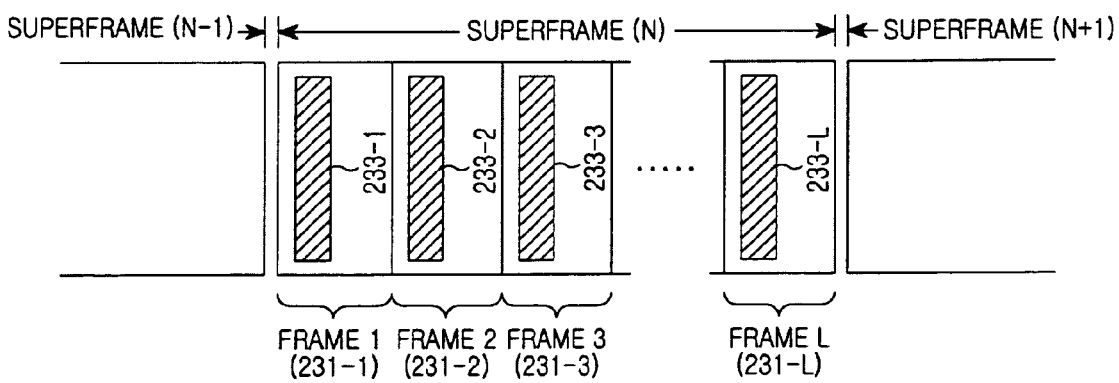

In accordance with exemplary embodiments of the present invention, the first part and the second part can be laid out in different manners, as illustrated in FIGS. 2A, 2B and 2C. In FIGS. 2A and 2B, first parts 213 and 223 are positioned at the starts of superframes. In FIG. 2C, first parts 233-1 to 233-L are distributed across lower frames. The remainder of each superframe except the first part is the second part in FIGS. 2A, 2B and 2C. The structure of the second part will be described below in the context of an OFDM system.

The second part is configured in a different manner depending on a communication environment. In the outdoor mobile communication environment, a cyclic prefix should be long due to a great multipath fading. The cyclic prefix can be shortened in the indoor short-range communication environment. Therefore, despite Fast Fourier Transform (FFT) of the same size, the length of an OFDM symbol in the time domain is different due to the different CP lengths. Thus it follows that a lower frame has a different configuration. For example, if a lower frame includes a fixed number of OFDM symbols, the lower frame varies in length depending on a communication environment. On the other hand, if the lower frame is fixed in length, the number of OFDM symbols included in the lower frame varies depending on a communication environment.

In the illustrated case of FIG. 2A, one lower frame has a fixed number of OFDM symbols. There are M lower frames 211-1 to 211-M in total, frame 1 to frame M. That is, M lower frames to carry user signals optimized for communication environments exist per superframe. Since the OFDM symbol length changes according to a communication environment, the number of lower frames, M changes depending on communication environments.

In the illustrated case of FIG. 2B, a lower frame is fixed in length. There are L lower frames 221-1 to 221-L in total, frame 1 to frame L. That is, L lower frames to carry user signals optimized for communication environments exist per superframe. Although the length of a lower frame and the number of lower frames L are the same irrespective of communication environments, the number of OFDM symbols included in a lower frame changes depending on communication environments. To keep the lengths of all lower frames equal, the first part 223 occupies part of frame 1. In other words, frame 1 is shorter than the other frames by the first part 223.

In the illustrated case of FIG. 2C, a lower frame is fixed in length and the first part 233-1 to 233-L are distributed to a plurality of lower frames 231-1 to 231-L (frame 1 to frame L). Although the lengths of frame 1 to frame L and the number of lower frames L are the same irrespective of communication environments, the number of OFDM symbols included in a lower frame changes depending on a communication environment.

A detailed description will be made of the frame structures illustrated in FIGS. 2A, 2B and 2C.

It is assumed commonly to the frame structures that a sampling frequency is 10.24 Mhz and an FFT size is 1024. If the first part includes eight OFDM symbols and a CP has 128 samples, the first part has a total of 9216 samples, 90 µs. Given a 50-ms superframe, a lower frame to carry a user signal is 49.1 ms.

Based on the above common conditions, a lower frame for the case of FIG. 2A can be designed as illustrated in Table 1.

TABLE 1

| Sampling frequency [MHz] | 10.24 | 10.24 | 10.24 | 10.24 |
|---|---|---|---|---|
| FFT size | 1024 | 1024 | 1024 | 1024 |
| CP length (ratio to FFT size) | 1/8 | 1/16 | 1/32 | 1/128 |
| CP length (number of samples) | 128 | 64 | 32 | 8 |
| CP length (time [µs]) | 12.5 | 5.25 | 3.125 | 0.78125 |
| OFDM symbol length (number of samples) | 1152 | 1088 | 1056 | 1032 |
| OFDM symbol length (time [µs]) | 112.5 | 106.25 | 103.125 | 100.7813 |
| Frame length (number of samples) | 9216 | 8704 | 8448 | 8256 |
| Frame length (time [µs]) | 900 | 850 | 825 | 806.25 |
| Number of lower frames per superframe | 55 | 58 | 60 | 62 |
| Number of guard samples | 5120 | 7168 | 5120 | 128 |
| Guard time [µs] | 500 | 700 | 500 | 12.5 |
| CP + guard time overhead [%] | 12.20 | 7.30 | 4.05 | 0.81 |

Table 1 describes frame structure parameters with respect to changes in CP length, in the case where one lower frame includes eight OFDM symbols. The remainder of dividing a 49.1-ms lower frame by eight OFDM symbols is a guard area being overhead. When a CP length is set to ⅛, one superframe includes 55 lower frames and the overhead from the CPs and guard areas is 12.2%. If the CP length is reduced to 1/128, one superframe includes 62 lower frames and the overhead from the CPs and guard areas drops to 0.81%.

Based on the common conditions, a lower frame for the case of FIG. 2B can be designed as illustrated in Table 2.

TABLE 2

| Sampling frequency [MHz] | 10.24 | 10.24 | 10.24 | 10.24 |
|---|---|---|---|---|
| FFT size | 1024 | 1024 | 1024 | 1024 |
| CP length (ratio to FFT size) | 1/8 | 1/16 | 1/32 | 1/128 |
| CP length (number of samples) | 128 | 64 | 32 | 8 |
| CP length (time [µs]) | 12.5 | 5.25 | 3.125 | 0.78125 |
| OFDM symbol length (number of samples) | 1152 | 1088 | 1056 | 1032 |
| OFDM symbol length (time [µs]) | 112.5 | 106.25 | 103.125 | 100.7813 |
| Number of OFDM symbols per lower frame | 44 | 47 | 48 | 49 |
| Number of guard samples | 512 | 64 | 512 | 632 |
| Guard time [µs] | 50 | 6.25 | 50 | 61.72 |
| CP + guard time overhead [%] | 12.20 | 6.00 | 4.00 | 2.00 |

Table 2 describes frame structure parameters with respect to changes in CP length, in the case where one lower frame is fixed to be 5 ms long. Due to the fixed lower frame length, each lower frame has a remainder depending on a CP length and the remainder is a guard area being overhead. When a CP length is set to ⅛, one superframe includes 44 lower frames and the overhead from the CPs and guard areas is 12%. If the CP length is reduced to 1/128, one superframe includes 49 lower frames and the overhead from the CPs and guard areas drops to 2%.

Regarding real communication environments, the design with a CP length of 12.5 μs is suitable for an outdoor macro cell mobile communication environment and the design with a CP length of 6.25 μs is suitable for an outdoor micro cell mobile communication environment. The design with a CP length of 3.125 μs is suitable for an indoor or outdoor pico cell mobile communication environment and the design with a CP length of 0.78125 μs is suitable for an indoor femto cell mobile communication environment.

One of design factors that is not described in Table 1 and Table 2 is pilot pattern. As a channel variation varies in the frequency domain with multipath fading, a pilot density changes in the frequency domain according to the degree of multipath fading. Simply, a frame structure can be designed so that a pilot density increases with a CP length in the frequency domain. Also, the frequency-domain pilot density is determined by a Doppler frequency (i.e., the velocity of an MS). In a fast mobile communication environment, pilots should be frequent in time, whereas in a slow mobile communication environment, pilots should be relatively sparse in time.

In a fast mobile communication environment with a CP length of 1/8, for example, if a frequency-domain pilot ratio is set to about 1/8 and a time-domain pilot ratio is set to about 1/4, communications are reliably made even when a subcarrier frequency is 2.5 MHz and an MS moves at a velocity of 129 km/h. In this case, a pilot overhead is around 3%. When a plurality of antennas is used, a pilot should be designated for each antenna. Hence, the resulting pilot overhead is 3×{number of antennas} %. The sum of the pilot overhead and the CP and guard area overhead is 20% or higher. However, even though the pilot ratio is reduced to 1/10 to 1/100 in a communication environment with a CP length of 1/128 relative to the indoor communication environment, it does not matter much. Thus it can be concluded that a signal structure optimized to a communication environment is designed by controlling a CP length and a pilot density according to the communication environment.

In this manner, a BS operates by selecting design parameters according to a communication environment in which it is placed and the design parameters are not changed unless the communication environment changes. Yet, design parameters for lower frames may be different even if they are included in one superframe. Accordingly, an MS checks design parameters selected by its serving BS and conducts communications based on the design parameters. The MS acquires the design parameter information from a first part of a superframe.

The first part resides at the start of the superframe as illustrated in FIGS. 2A and 2B, or is distributed to lower frames as illustrated in FIG. 2C. Aside from these cases, the first part can be positioned in various manners according to a preset position and configuration. The signal of the first part is designed to be robust under the worst communication environment so that it is reliable in any communication environment. The first part functions to indicate the start of the superframe, to provide information about the physical configuration of a signal in the second part, information about the physical positions of resource areas defined for technologies supported to improve communication performance, design parameter information, and information about the physical position and system information of a resource area supporting communications of an MS not compliant with the present invention, and to enable inter-BS interworking and self-configuration. The physical configuration information includes design parameters and system information, such as information about a system bandwidth, duplex-relayed design parameters, the number of transmit antennas, the transmit power of a reference signal, a superframe number, a BS Identifier (ID), a sector ID, random access information, and paging information. The technologies supported to improve the communication performance include a relay communication technology, a multicarrier communication technology, and a P2P communication technology. The first part is logically divided according to its usages as illustrated in FIG. 3.

Figure 3:
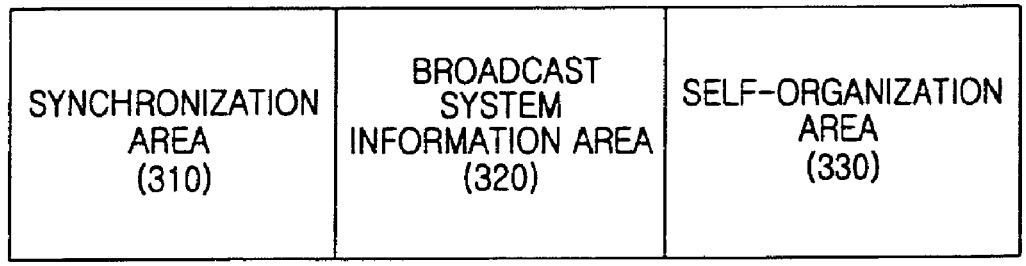
FIG. 3 illustrates the structure of a first part of the superframe in the broadband wireless communication system according to an exemplary embodiment of the present invention.
Figure 4:
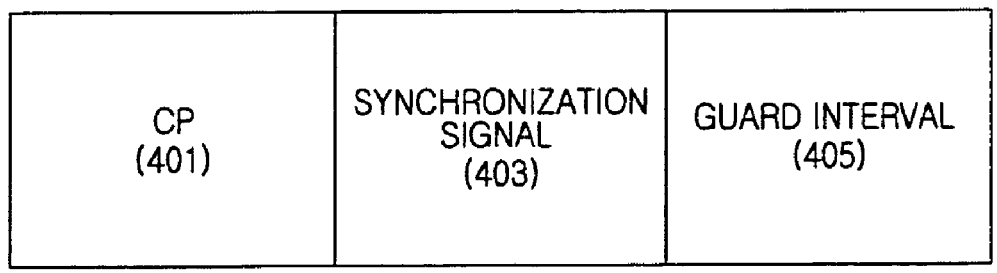
FIG. 4 illustrates the structure of a self-organization area in the first part of the superframe in the broadband wireless communication system according to an exemplary embodiment of the present invention.

Referring to FIG. 3, a synchronization area 310 carries a signal that indicates the start of the superframe, provides time and frequency synchronization, and identifies a BS and a cell.

A broadcast system information area 320 transmits to an MS information required for communications between the BS and the MS. For example, the information includes information about the structure of the superframe and system parameters. Especially the information includes information about the physical signal configuration of a second part transmitted by the BS. That is, the BS broadcasts the physical configuration information (i.e., design parameter information) about the second part in the broadcast system information area 320. The design parameter information includes a system bandwidth, duplex-related design parameter information, the number of transmit antennas, the transmit power of a reference signal, a superframe number, a BS ID, a sector ID, random access information, and paging information. According to an exemplary embodiment of the present invention, if lower frames have different design parameters in one superframe, the system information includes the number of groups of lower frames formed according to physical signal configurations, the indexes of lower frames in each group, and design parameter information about each group. The design parameter information includes individual design parameter values or an ID representing a predetermined combination of design parameters. Therefore, the MS can communicate with the BS only if it checks information included in the broadcast system information area 320.

The broadcast system information area 320 may also include information about the whole or part of areas defined for technologies that improve the performance of BS-MS communications or MS-MS communications in the second part. To simultaneously support MSs compliant with different communication standards, the second part can be divided according to the communication standards and the broadcast system information area 320 can broadcast information about the division to MSs. For instance, when MS A compliant with IEEE 802.16e and MS B compliant with IEEE 802.16m are to be supported simultaneously, the BS divides the second part into area A for IEEE 802.16e and area B for IEEE 802.16m and notifies MS B of the division information. Because IEEE 802.16e was developed earlier than IEEE 802.16m, a system design should be made to ensure compatibility so that MS A can conduct communications normally without separately acquiring the division information.

A self-organization area 330 is used to support reliable communications. The self-organization area 330 provides an inter-BS synchronization acquisition function, an inter-cell interference measuring function, and a handover information providing function. According to an exemplary embodiment of the present invention, these functions are all performed in every superframe or selectively performed according to a predetermined pattern.

Regarding the inter-BS synchronization acquisition function of the self-organization area 330, when a BS transmits a preset synchronization signal for synchronization between BSs in the self-organization area 330, the other BSs acquire superframe synchronization with the BS by the synchronization signal. This synchronization acquisition scheme is very useful to indoor BSs to which the Global Positioning System (GPS) is not available. That is, an indoor BS acquires synchronization with an outdoor GPS-enabled BS by a synchronization signal received from the outdoor BS. Using a synchronization signal transmitted from the synchronized indoor BS, other indoor BSs acquire synchronization. In the case where only GPS-disabled BSs exist, the other BSs synchronize their timings with one BS. For instance, a synchronization area for synchronization between BSs includes a CP 401, a synchronization signal 403, and a guard interval 405 in FIG. 4. To acquire synchronization with another BS, a BS should transition from a transmission mode to a reception mode. If synchronization acquisition has failed, an additional time error occurs due to an initial synchronization error. To guarantee the time required for transmission-reception mode transition, the CP 401 is designed to be longer than the CP of another OFDM symbol in the first part. For example, if the CP length of an OFDM symbol in the broadcast system information area 320 of the first part is ⅛, the CP 401 is designed to be ¼ or ½ long. Thus, despite the time taken for transmission-reception mode change, a multipath fading error, and the initial synchronization error, the BS can detect the synchronization signal 403. After the synchronization acquisition, the BS needs time for transmission-reception mode transition again. That is why the guard interval 405 is needed. The guard interval 405 is also used to overcome a time delay that occurs when the receiving BS is far away from the transmitting BS. In this context, the guard interval 405 is preferably as long as or longer than two OFDM symbol intervals. In accordance with an exemplary embodiment of the present invention, the CP 401 can be replaced by the guard interval 405.

Figure 5:
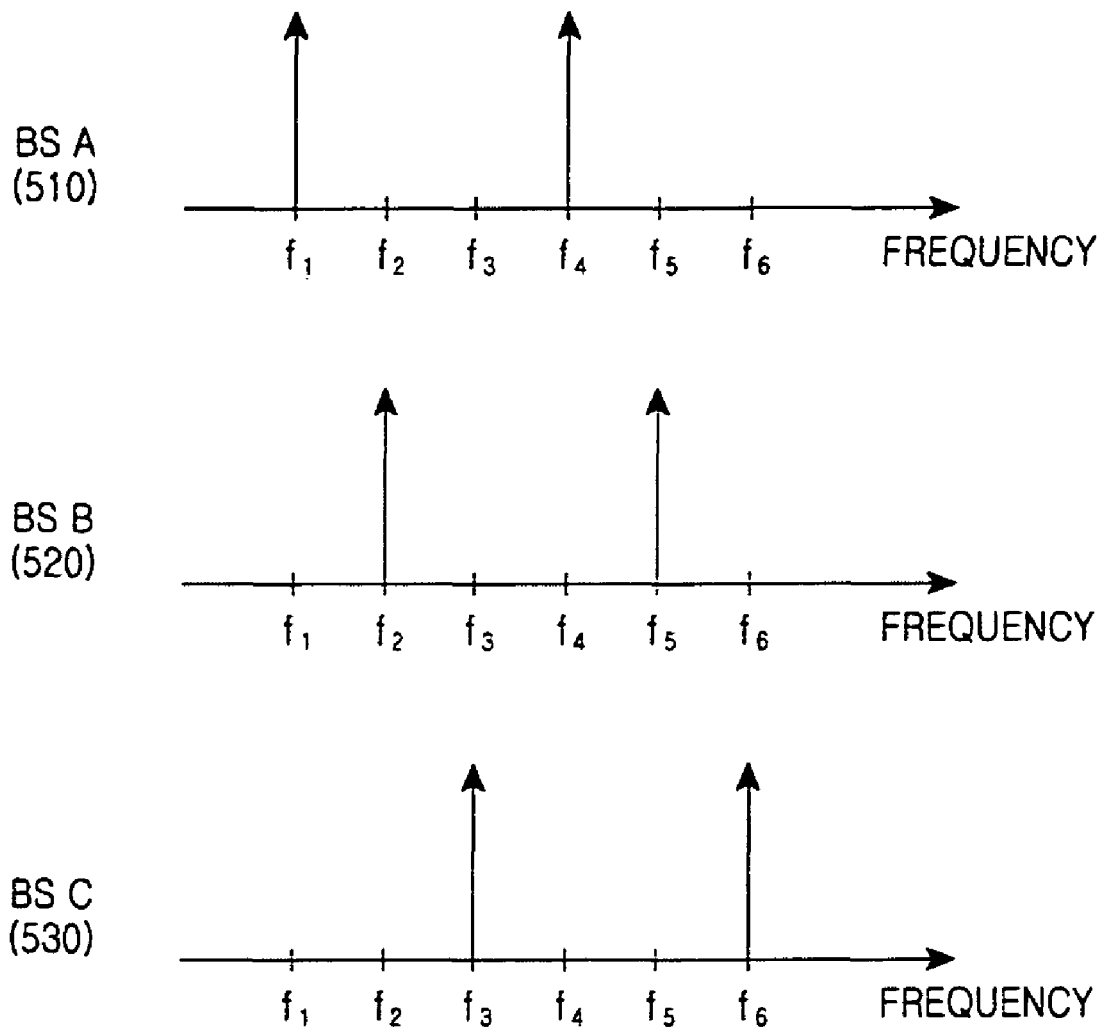
FIG. 5 illustrates interference measurement signals in the broadband wireless communication system according to an exemplary embodiment of the present invention.

In relation to the inter-cell interference measuring function that the self-organization area 330 offers, one BS transmits an interference measurement signal using part of the self-organization area 330 and the other BSs measure inter-cell interference by receiving the interference measurement signal. The BSs perform this operation sequentially in a predetermined BS order. The interference measurement signal is a preset signal having variable amplitudes in frequency bands to thereby compute an average user signal power in each frequency band. If the amplitude of the received interference measurement signal in a particular frequency band is K, this implies that an average user signal power that a BS transmits in the particular frequency band is K. Thus, each BS can control interference by measuring the interference of each frequency band from another BS. The interference control is performed in various schemes and any of the present interference control schemes is applicable to the present invention. The interference measurement signal is also used for an MS to measure interference. That is, the MS receives interference measurement signals from neighbor BSs, measures interferences from the neighbor BSs using the interference measurement signals, and feeds back the interference measurements to its serving BS. Thus the serving BS acquires interference information about the MS and effectively controls interference. In accordance with an exemplary embodiment of the present invention, the MS or the BS alone, or both, can measure interference. When one BS receives an interference measurement signal from another BS, the receiving BS should transition from a transmission mode to a reception mode, as done when receiving the synchronization signal. Therefore, similarly to the synchronization signal, a CP and a guard interval reside at the start and end of the interference measurement signal, respectively. Also, each interference measurement signal occupies only a partial frequency band so that a plurality of BSs can transmit interference measurement signals during the same time period. For example, in the case where interference measurement signals occupy different frequency areas as illustrated in FIG. 5, a BS 520 (BS B) transmits an interference measurement signal at f2 and f5, and a BS 530 (BS C) transmits an interference measurement signal at f3 and f6. In this manner, a plurality of BSs simultaneously transmit interference measurement signals in different frequency areas, thereby reducing the time required for measuring interference.

As to the handover information providing function of the self-organization area 330, the self-organization area 330 helps an MS with a handover by providing handover information. A BS transmits its information to an MS communicating with another BS in the self-organization area 330, indicating that the MS can perform a handover to the BS. The transmitted information is needed for handover, such as a BS ID. For example, in the illustrated case of FIG. 1, when an MS moves from Cell A with a broad coverage to Cell B with a small coverage, communicating with Cell B is of a better advantage to the MS than continuing on-going communications with Cell A, in terms of power consumption. To perform a handover from BS A of Cell A to BS B of Cell B, the MS should scan neighbor BSs from time to time. Yet, the handover information that the self-organization area 330 provides reduces the scanning constraint of the MS. Since BS B knows that Cell B is overlaid on Cell A since the time of its installation, it transmits its information in an FA or a frequency band used by BS A in the self-organization area 330. Notably, BS A transmits no signals in the self-organization area 330. As the MS receives the signal from BS B, it determines that it has entered Cell B and at the same time, acquires information about BS B. To render this function viable, superframe synchronization should be acquired between BS A and BS B. This is achieved by the inter-BS synchronization function of the self-organization area 330.

The above-described inter-BS synchronization acquisition function, inter-cell interference measurement function, and handover information providing function of the self-organization area 330 are performed selectively in every superframe according to a predetermined pattern or simultaneously by dividing a frequency area. While not described in detail, the self-organization area 330 can further be used for signal transmission on radio channels between BSs or signal transmission to an MS in a neighbor cell. In another exemplary embodiment of the present invention, the functions of the self-organization area 330 can be performed in an area other than the first part of the superframe. That is, the self-organization area 330 can be positioned outside the first part.

Figure 6:
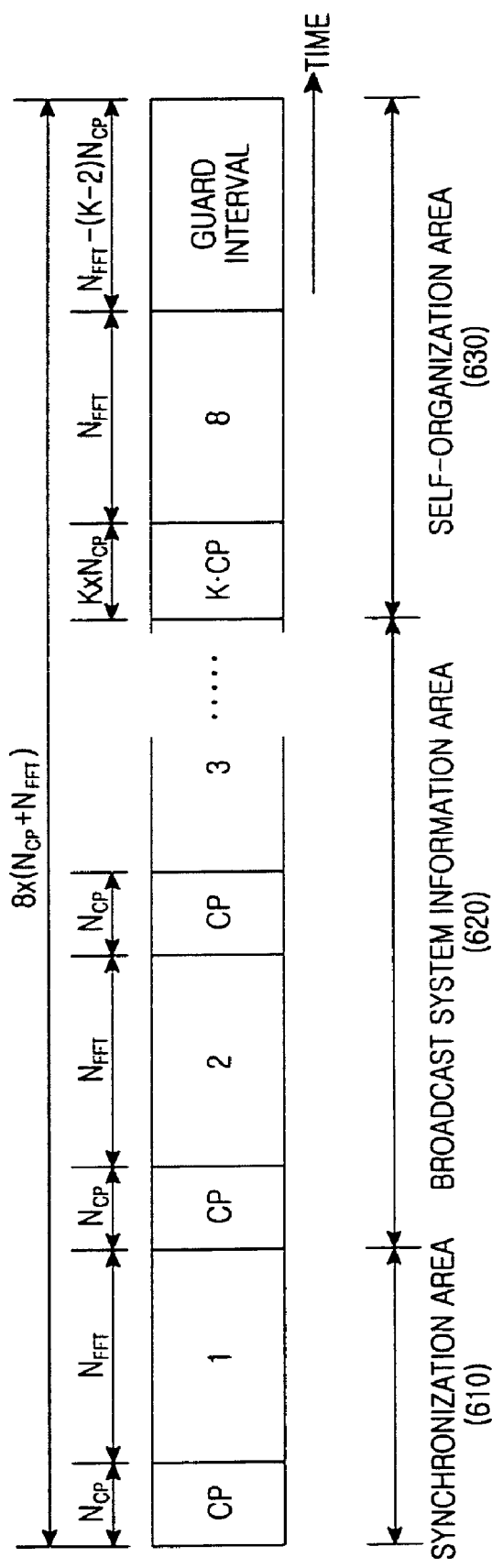
FIG. 6 illustrates the time-domain signal configuration of the first part of the superframe in the broadband wireless communication system according to an exemplary embodiment of the present invention.

An exemplary time-domain signal configuration of the first part including the synchronization area, the broadcast system information area, and the self-organization area is illustrated in FIG. 6.

Referring to FIG. 6, the first part has a total of 8×(NCP+NFFT) samples. A synchronization area 610 is as long as one OFDM symbol, a broadcast system information area 620 is six OFDM symbols long, and a self-organization area 630 is two OFDM symbols long. Yet, the self-organization area 630 includes as much data as one OFDM symbol and the other area is allocated to a prolonged CP and guard interval.

Now the configurations and operation of a BS and an MS that operate based on the above-described frame structure will be described in detail.

Figure 7:
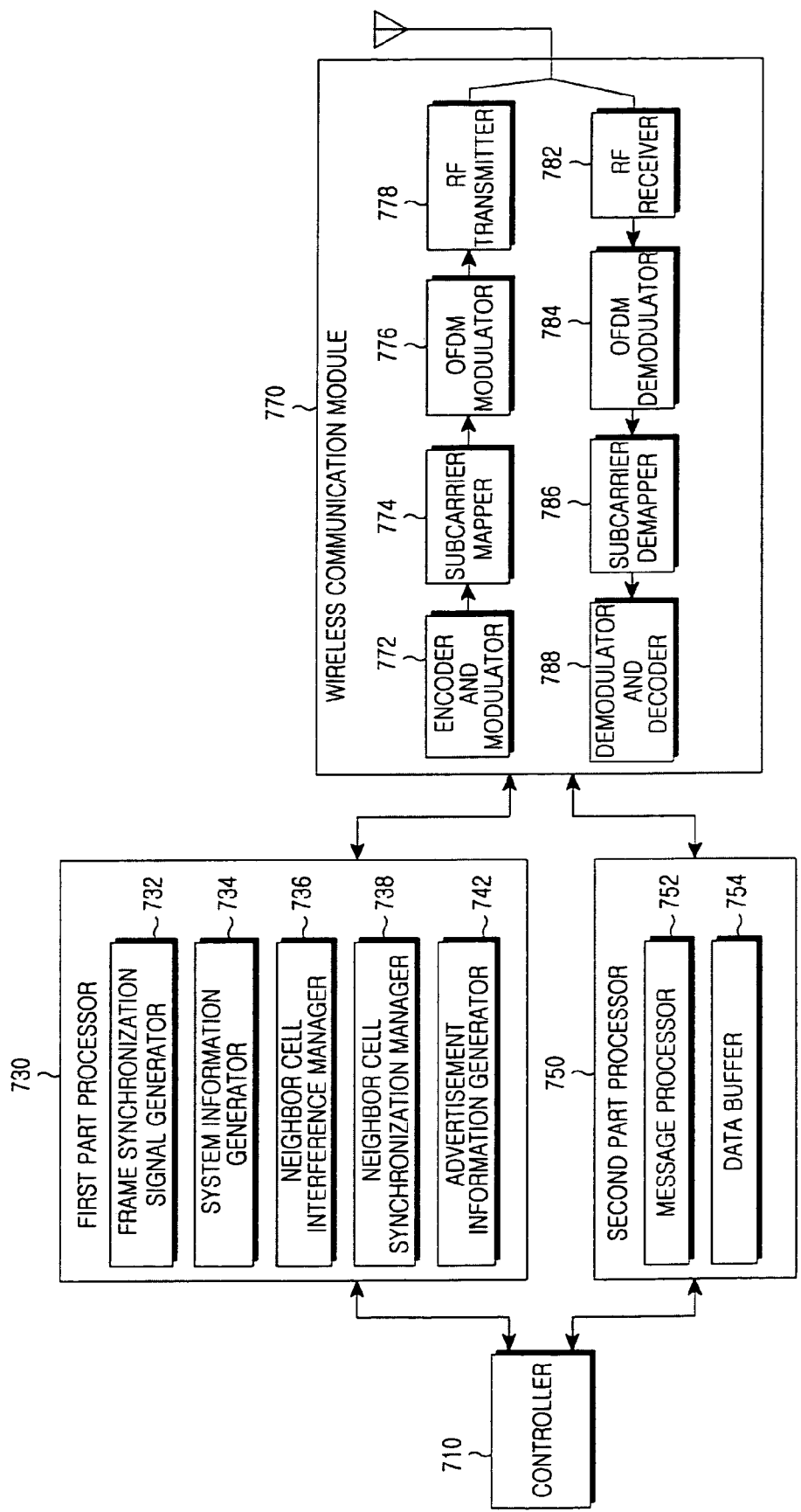
FIG. 7 is a block diagram of a BS in the broadband wireless communication system according to an exemplary embodiment of the present invention.

FIG. 7 is a block diagram of a BS in the broadband wireless communication system according to an exemplary embodiment of the present invention.

Referring to FIG. 7, the BS includes a controller 710, a first part processor 730, a second part processor 750, and a wireless communication module 770.

The controller 710 provides overall control to the BS, for communications with an MS. For example, the controller 710 provides information required for operations of the first and second part processors 730 and 750 and schedules communications in the second part of a superframe. For communications in the second part, a relay communication technology, a multimedia communication technology, and a P2P communication technology can be implemented and the controller 710 allocates part or the whole of the second part as resources for the relay communication technology, the multimedia communication technology, and the P2P communication technology. To support an MS that does not comply with the present invention, the controller 710 divides the second part according to communication standards. Also, the controller 710 controls interference based on neighbor cell interference measured in the first part processor 730 or neighbor cell interference information received from the MS. The controller 710 determines whether the first part processor 730 is to perform the functions of a self-organization area. That is, since the functions of the self-organization area are selectively performed in every superframe according to a predetermined pattern, the controller 710 controls a block that performs a function of the self-organization area based on the predetermined pattern. Notably, the controller 710 controls such that no function is performed based on the self-organization area while a neighbor BS transmits advertisement information.

The first part processor 730 performs functions based on the first part of the superframe according to the present invention. The first part processor 730 includes a frame synchronization signal generator 732, a system information generator 734, a neighbor cell interference manager 736, a neighbor cell synchronization manager 738, and an advertisement information generator 742.

The frame synchronization signal generator 732 generates a superframe synchronization signal to be transmitted in the synchronization area of the first part. The superframe synchronization signal is used to indicate the start of the superframe to the MS, to enable time and frequency synchronization acquisition, and identify a BS and a cell.

The system information generator 734 generates system information to be transmitted in the broadcast system information area of the first part. The system information refers to information that the MS requires for BS-MS communications or MS-MS communications. For example, the information required for the MS includes information about the configuration of the superframe and system parameters. Particularly, the information required for the MS includes information about the physical signal configuration of the second part (i.e., design parameter information such as a system bandwidth, duplex-related design parameter information, the number of transmit antennas, the transmit power of a reference signal, a superframe number, a BS ID, a sector ID, random access information, and paging information) according to the present invention. If lower frames of a superframe have different design parameters, the physical signal configuration information includes the number of groups of lower frames formed according to their physical signal configurations, the indexes of lower frames in each group, and design parameter information about each group. The design parameter information includes individual design parameter values or a predetermined ID identifying a combination of design parameter values. The system information generator 734 generates information indicating part or the whole of the second part allocated for technologies to improve communication performance between MSs (e.g., a relay communication technology, a multicarrier communication technology, and a P2P communication technology) to the MS. Also, the system information generator 734 generates information about division of the second part according to communication standards.

The neighbor cell interference manager 736 processes an inter-neighbor interference measuring function that is performed using the self-organization area of the first part. In other words, the neighbor cell interference manager 736 generates an interference measurement signal to be transmitted to a neighbor BS and outputs the interference measurement signal. Also, the neighbor cell interference manager 736 measures interference using an interference measurement signal received from a neighbor BS. The interference measurement signal is a preset signal with the amplitude of each frequency band set to the average power of a user signal in the frequency band. That is, the interference measurement signal varies in amplitude along the frequency axis in proportion to the average transmit power of each frequency band. Therefore, when generating the interference measurement signal, the neighbor cell interference manager 736 checks the average power of a user signal (i.e., a signal transmitted in the second part) in each frequency band and generates the interference measurement signal by reflecting the average power of each frequency band.

The neighbor cell synchronization manager 738 processes the inter-BS synchronization acquisition function that is performed using the self-organization area of the first part, that is, the function of starting and ending a superframe simultaneously with a neighbor BS. In other words, the neighbor cell synchronization manager 738 generates a predetermined synchronization signal and outputs it to the wireless communication module 770, or acquires inter-BS synchronization using a synchronization signal received from another BS. The neighbor cell synchronization manager 738 performs the synchronization signal generation or the synchronization acquisition selectively under the control of the controller 710. That is, when the BS itself cannot acquire synchronization, the neighbor cell synchronization manager 738 acquires synchronization using a synchronization signal from another BS. If the BS itself can acquire synchronization, the neighbor cell synchronization manager 738 generates a synchronization signal for other BSs that cannot acquire synchronization on their own.

The advertisement information generator 742 processes the handover information providing function that is performed based on the self-organization area of the first part. That is, the advertisement information generator 742 generates handover information that an MS communicating with another BS needs to perform a handover to the BS. The handover information includes a BS ID.

The second part processor 750 processes a function that is performed by the second part of the superframe (i.e., a general communication function) according to the present invention. The second part processor 750 includes a message processor 752 and a data buffer 754.

The message processor 752 generates and interprets control messages needed for communications with an MS. For example, the message processor 752 generates Media Access Control (MAC) control messages including a Downlink Channel Descriptor/Uplink Channel Descriptor (DCD/UCD) for describing physical information about channels and a MAP message for providing resource allocation information. Also, the message processor 752 interprets a handover-related control message and a ranging message received from the MS. The data buffer 754 buffers data to be transmitted to the MS and data received from the MS, and provides the transmission data to the wireless communication module 770 according to a scheduling result.

The wireless communication module 770 is responsible for signal processing to conduct communications on a radio channel. The wireless communication module 770 includes an encoder and modulator 772, a subcarrier mapper 774, an OFDM modulator 776, a radio frequency (RF) transmitter 778, an RF receiver 782, an OFDM demodulator 784, a subcarrier demapper 786, and a demodulator and decoder 788.

The encoder and modulator 772 encodes an information bit stream and modulates the coded bits to complex symbols. The subcarrier mapper 774 maps the complex symbols to subcarriers. For a control signal, the subcarrier mapper 774 maps the complex symbols to predetermined subcarriers and for a data signal, it maps the complex symbols according to the scheduling of the controller 710. Also, the subcarrier mapper 774 inserts pilot symbols between data symbols according to a pattern preset according to the cell communication environment of the BS.

The OFDM modulator 776 Inverse Fast Fourier Transform (IFFT)-processes the mapped signals and inserts a CP in the IFFT signals, thus creating a time-domain OFDM symbol. For a signal transmitted in the first part, the OFDM modulator 776 generates an OFDM symbol with a CP of a length corresponding to the first part according to a system common signal configuration. Particularly, the OFDM modulator 776 generates an OFDM symbol in which a signal transmitted in the self-organization area of the first part has a CP or guard interval of a prolonged length. For a signal transmitted in the second part, the OFDM modulator 776 generates an OFDM symbol according to a signal configuration depending on the cell communication environment of the BS. The RF transmitter 778 converts the OFDM symbol to an analog signal, upconverts the analog signal to an RF signal, and transmits the RF signal through an antenna.

The RF receiver 782 downconverts an RF signal received through the antenna to a baseband signal and converts the baseband signal to a digital signal. The OFDM demodulator 784 separates the received signal on an OFDM symbol basis, removes a CP from an OFDM symbol, and recovers subcarrier signals by Fast Fourier Transform (FFT). The subcarrier demapper 786 demaps complex symbols from subcarriers by logically separating the complex symbols and provides them to the demodulator and decoder 788 except that it provides them to the first part processor 730, if the demapped complex symbols are from a synchronization signal and an interference measurement signal received from another BS. The demodulator and decoder 788 demodulates and decodes the complex symbols, thus recovering an information bit stream.

Figure 8:
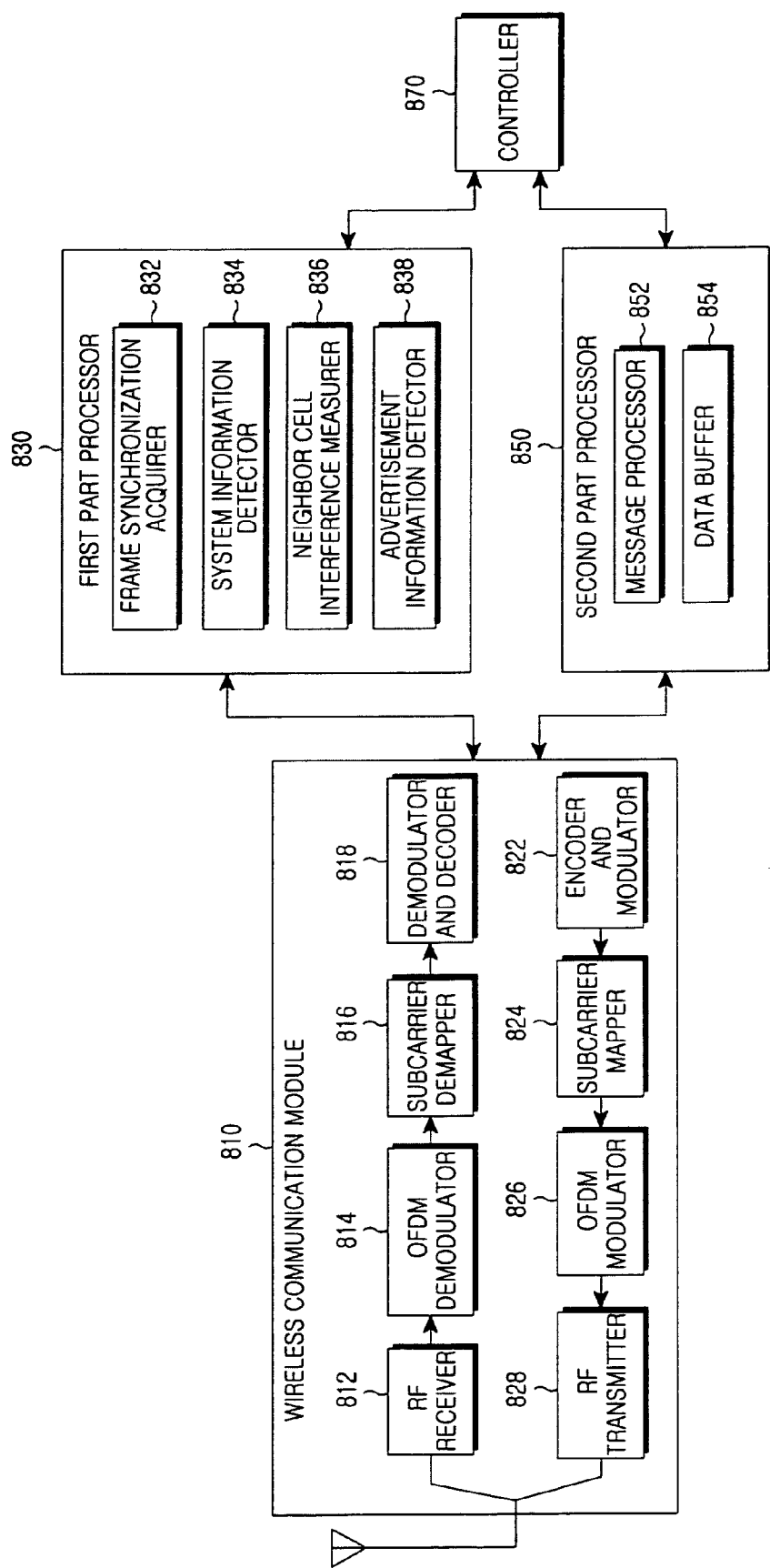
FIG. 8 is a block diagram of an MS in the broadband wireless communication system according to an exemplary embodiment of the present invention.

FIG. 8 is a block diagram of an MS in the broadband wireless communication system according to an exemplary embodiment of the present invention.

Referring to FIG. 8, the MS includes a wireless communication module 810, a first part processor 830, a second part processor 850, and a controller 870.

The wireless communication module 810 is responsible for signal processing to conduct communications on a radio channel. The wireless communication module 810 includes an RF receiver 812, an OFDM demodulator 814, a subcarrier demapper 816, a demodulator and decoder 818, an encoder and modulator 822, a subcarrier mapper 824, an OFDM modulator 826, and an RF transmitter 828.

The RF receiver 812 downconverts an RF signal received through an antenna to a baseband signal and converts the baseband signal to a digital signal. The OFDM demodulator 814 separates the received signal on an OFDM symbol basis, removes a CP from an OFDM symbol, and recovers subcarrier signals by FFT. For a signal received in the first part of a superframe, the OFDM demodulator 814 processes the signal, taking into account a CP of a length corresponding to the first part according to a system common signal configuration. Particularly, the OFDM demodulator 814 processes a signal received in the self-organization area of the first part, taking into account a prolonged CP and guard interval. For a signal received in the second part, the OFDM demodulator 814 processes the signal according to signal configuration information about the second part received from a serving BS.

The subcarrier demapper 816 demaps signals to be demodulated among complex symbols mapped to subcarriers and provides the demapped signals to the demodulator and decoder 818. If the demapped signals are for a synchronization signal and an interference measurement signal received in the first part, the subcarrier demapper 816 provides them to the first part processor 830. The signal received in the second part includes traffic symbols and pilot symbols. Because the insertion pattern of the pilot symbols varies depending on a cell communication environment, the subcarrier demapper 816 separates the traffic symbols from the pilot symbols based on the signal configuration information about the second part. The demodulator and decoder 818 demodulates and decodes the complex symbols, thus recovering an information bit stream.

The encoder and modulator 822 encodes an information bit stream and modulates the coded bits to complex symbols. The subcarrier mapper 824 maps the complex symbols to subcarriers (i.e., radio resources allocated by the BS). The OFDM modulator 826 IFFT-processes the mapped signals and inserts a CP in the IFFT signals, thus creating a time-domain OFDM symbol. The OFDM symbol is generated according to design parameters received from the serving BS. The RF transmitter 828 converts the OFDM symbol to an analog signal, upconverts the analog signal to an RF signal, and transmits the RF signal through the antenna.

The first part processor 830 processes a signal and information received in the first part of the superframe according to the present invention. The first part processor 830 includes a frame synchronization acquirer 832, a system information detector 834, a neighbor cell interference measurer 836, and an advertisement information detector 838.

The frame synchronization acquirer 832 acquires superframe synchronization using a superframe synchronization signal received in the synchronization area of the first part. The superframe synchronization signal is used to indicate the start of the superframe to the MS, to enable time and frequency synchronization acquisition, and identify a BS and a cell.

By interpreting system information received in the broadcast system information area of the first part, the system information detector 834 detects information required for communications and information about the physical configuration of a signal in the second part, i.e. design parameter information including a system bandwidth, duplex-related design parameter information, the number of transmit antennas, the transmit power of a reference signal, a superframe number, a BS ID, a sector ID, random access information, and paging information, and design parameter information and physical position information about part or the whole of the second part allocated for technologies to improve communication performance (e.g., a relay communication technology, a multicarrier communication technology, a P2P communication technology, and support of an MS not compliant with the present invention). If lower frames have different design parameters the superframe, the physical signal configuration information includes the number of groups of lower frames formed according to their physical signal configurations, the indexes of lower frames in each group, and design parameter information about each group. The design parameter information includes individual design parameter values or a predetermined ID identifying a combination of design parameter values.

The neighbor cell interference measurer 836 measures interference from a neighbor BS using an interference measurement signal received in the self-organization area of the first part. The interference measurement signal is a preset signal with the amplitude of each frequency band set to the average power of a user signal in the frequency band. That is, the interference measurement signal varies in amplitude along the frequency axis in proportion to the average transmit power of each frequency band.

The advertisement information detector 838 detects handover information required for a handover to a BS other than the serving BS by interpreting advertisement information received in the self-organization area of the first part. The advertisement information generator 838 is aware from the advertisement information that the MS can perform a handover to the BS transmitting the advertisement information and notifies the controller 870 that the handover is available. The handover information includes information required for handover such as a BS ID.

The second part processor 850 processes a function that is performed by the second part of the superframe (i.e., a general communication function) according to the present invention. The second part processor 850 includes a message processor 852 and a data buffer 854.

The message processor 852 generates and interprets control messages needed for communications with a BS. For example, the message processor 852 interprets MAC control messages including a DCD/UCD that describes physical information about channels and a MAP message that provides resource allocation information. Also, the message processor 852 generates a handover-related control message and a ranging message. Particularly, the message processor 852 generates a control message for reporting interference information measured by the neighbor cell interference measurer 836 to the serving BS. The message processor 852 also generates and interprets P2P communication control messages. The data buffer 854 buffers data to be transmitted to the BS and data received from the BS, and provides the transmission data to the wireless communication module 810 under the control of the controller 870.

The controller 870 provides overall control to the MS, for communications. For example, the controller 870 controls timings to transmit and receive appropriate signals according to a superframe structure and provides information required for operations of the first and second part processors 830 and 850. The controller 870 provides the signal configuration information about the second part received from the serving BS to the wireless communication module 810 and controls the wireless communication module 810 to operate according to a signal structure that depends on a cell communication environment. Also, the controller 870 determines whether to perform a handover to the BS to which the advertisement information detector 838 says that the MS can perform the handover.

Figure 9:
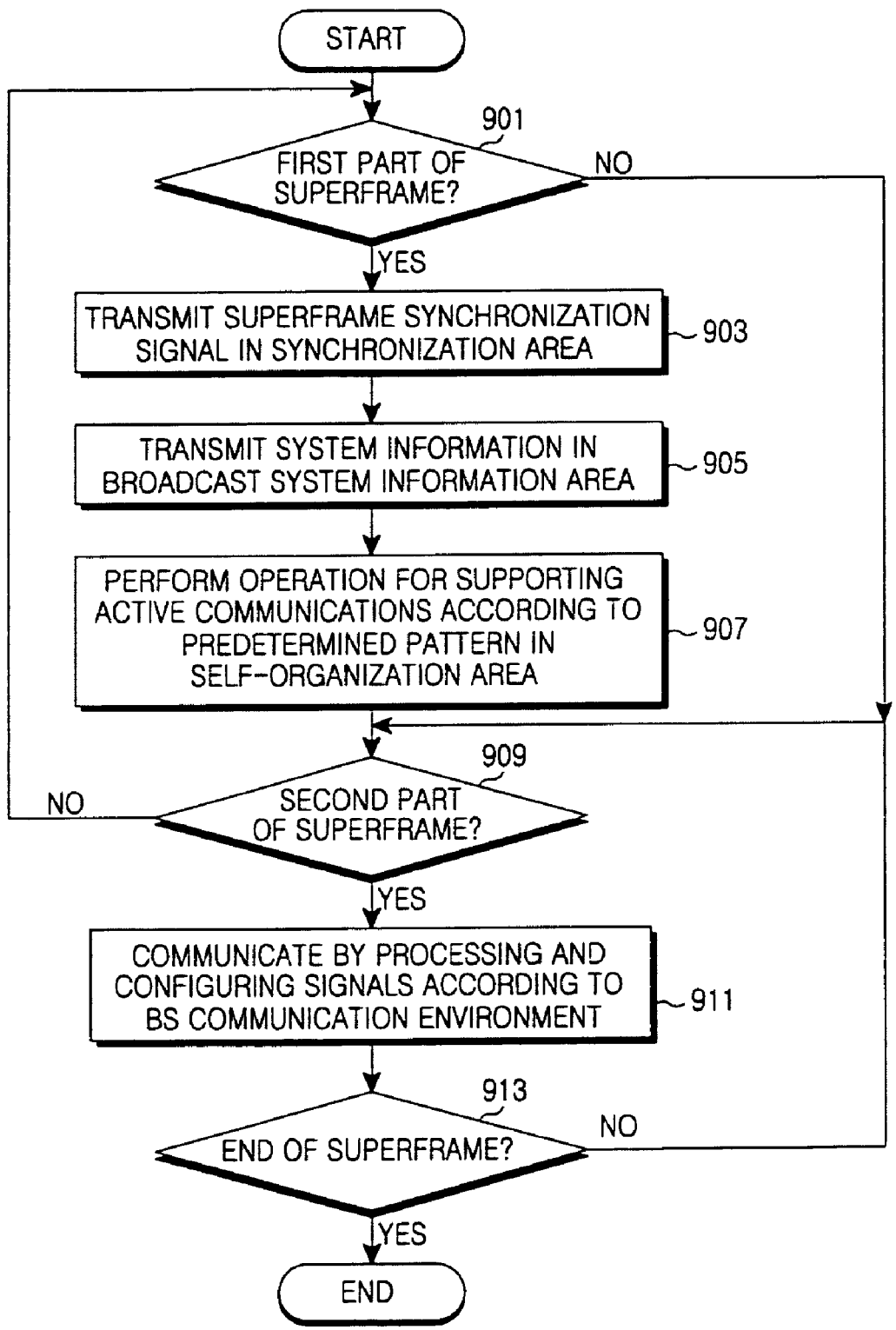
FIG. 9 is a flowchart illustrating an operation of the BS in the broadband wireless communication system according to an exemplary embodiment of the present invention.

FIG. 9 is a flowchart illustrating an operation of the BS in the broadband wireless communication system according to an exemplary embodiment of the present invention. This BS operation is about processing a superframe.

Referring to FIG. 9, the BS determines whether it is time to use the first part of the superframe in step 901. Since the position and distribution of the first part are preset according to system setting, the determination is made by checking a relative time difference from the start of the superframe.

If it is time to use the first part of the superframe, the BS transmits a superframe synchronization signal in the synchronization area of the first part in step 903. The superframe synchronization signal is used for indicating the start of the superframe to an MS, for enabling time and frequency synchronization acquisition, and for BS and cell identification.

In step 905, the BS transmits its system information in the system information area of the first part. The system information is information required for MSs, for BS-MS communications. For example, this information includes information about the configuration of the superframe and system parameters. Particularly the information required for MSs includes information about the physical signal configuration of the second part according to the present invention. That is, the BS transmits the physical configuration information about a signal in the second part, i.e. design parameter information including a system bandwidth, duplex-relayed design parameters, the number of transmit antennas, the transmit power of a reference signal, a superframe number, a BS ID, a sector ID, random access information, and paging information, and design parameter information and physical position information about part or the whole of the second part allocated for technologies to improve communication performance (e.g., a relay communication technology, a multicarrier communication technology, a P2P communication technology, and support of an MS not compliant with the present invention). If lower frames have different design parameters the superframe, the physical signal configuration information includes the number of groups of lower frames formed according to their physical signal configurations, the indexes of lower frames in each group, and design parameter information about each group. The design parameter information includes individual design parameter values or a predetermined ID identifying a combination of design parameter values. If the BS uses a plurality of FAs, information about the second part is configured on an FA basis and transmitted.

The BS performs an operation for supporting reliable communications according to a predetermined pattern in the self-organization area of the first part in step 907. The operation that the BS can perform in the self-organization area includes at least one of interference measurement signal transmission, interference measurement, transmission of a synchronization signal between BSs, synchronization acquisition between BSs, transmission of advertisement information for handover, and waiting so that an MS connected to the BS can receive advertisement information from a neighbor BS. The BS selectively performs at least one of the above operations in every superframe according to the predetermined pattern. A signal transmitted in the self-organization area has a longer CP or guard interval than other signals transmitted in the first part.

In step 909, the BS determines whether it is time to use the second part of the superframe. Since the position and distribution of the second part are preset according to system setting, the determination is made by checking a relative time difference from the start of the superframe.

When it is time to use the second part, the BS processes and configures a signal according to the physical signal configuration information about the second part, included in the system information transmitted in step 905, and conducts communications accordingly in step 911. A party with which the communications are conducted can be an MS or an RS.

Herein, the design parameters include a CP length, a pilot pattern, etc. To be more specific, the BS conducts the communications by resource scheduling, MAP message transmission, transmission and reception of data signals, and transmission and reception of control messages. Also, the BS carries out interference control based on interference information that it measures or interference information received from MSs.

In step 913, the BS determines whether the superframe has ended. If the superframe has not ended, the BS returns to step 909.

Figure 10:
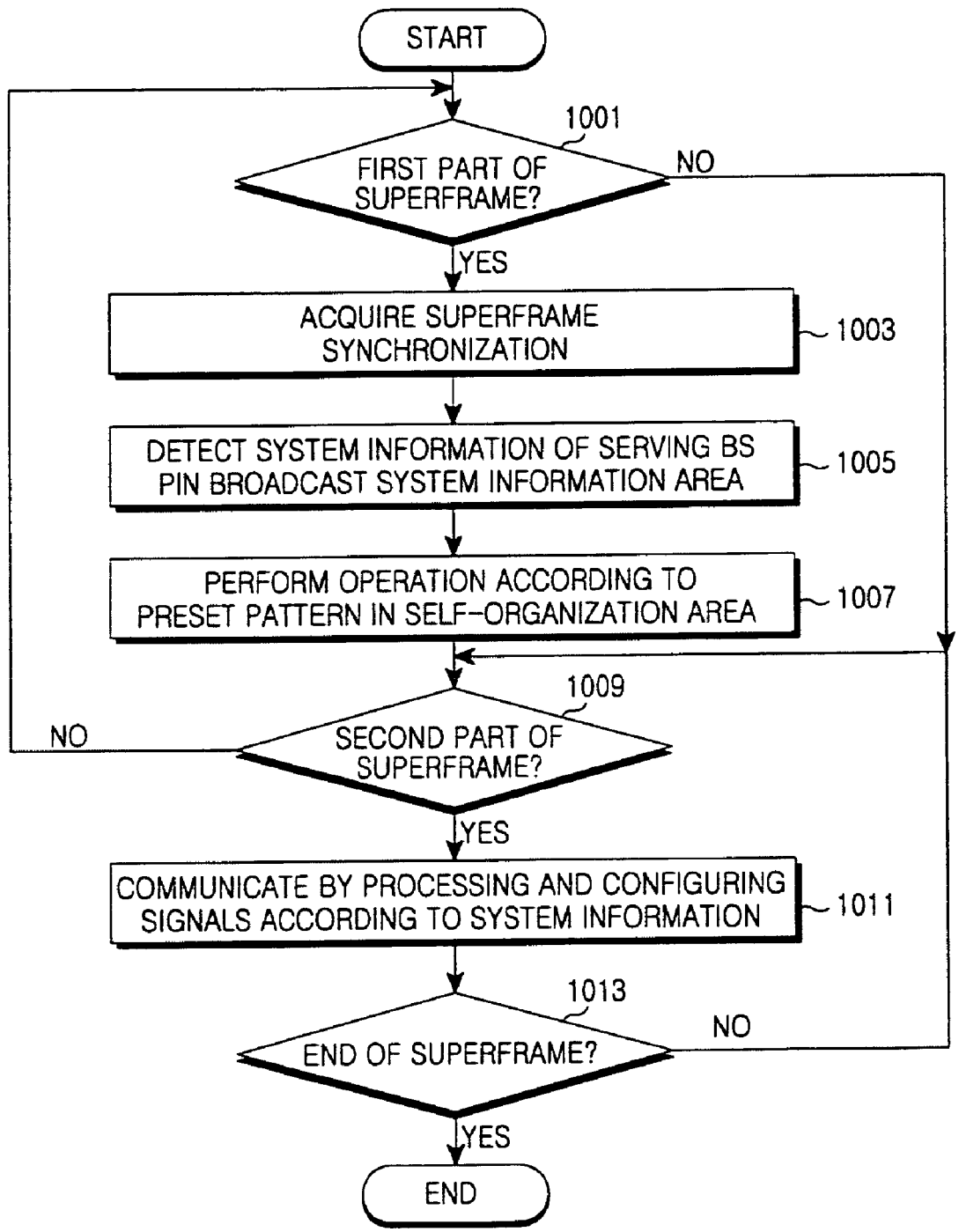
FIG. 10 is a flowchart illustrating an operation of the MS in the broadband wireless communication system according to an exemplary embodiment of the present invention.

FIG. 10 is a flowchart illustrating an operation of the MS in the broadband wireless communication system according to an exemplary embodiment of the present invention. The MS operation is about processing a superframe.

Referring to FIG. 10, the MS determines whether it is time to use the first part of the superframe in step 1001. Since the position and distribution of the first part are preset according to system setting, the determination is made by checking a relative time difference from the start of the superframe.

If it is time to use the first part of the superframe, the MS receives a superframe synchronization signal in the synchronization area of the first part and acquires superframe synchronization using the superframe synchronization signal in step 1003. The superframe synchronization signal is used for indicating the start of the superframe to an MS, for enabling time and frequency synchronization acquisition, and for BS and cell identification.

In step 1005, the MS receives system information of its serving BS in the system information area of the first part and detects information required for communications and physical configuration information about the second part, i.e. design parameter information including a system bandwidth, duplex-relayed design parameters, the number of transmit antennas, the transmit power of a reference signal, a superframe number, a BS ID, a sector ID, random access information, and paging information, and design parameter information and physical position information about part or the whole of the second part allocated for technologies to improve communication performance (e.g. a relay communication technology, a multicarrier communication technology, a P2P communication technology, and support of an MS not compliant with the present invention). If lower frames have different design parameters the superframe, the physical signal configuration information includes the number of groups of lower frames formed according to their physical signal configurations, the indexes of lower frames in each group, and design parameter information about each group. The design parameter information includes individual design parameter values or a predetermined ID identifying a combination of design parameter values. If the BS uses a plurality of FAs, information about the second part is configured on an FA basis and transmitted.

The MS performs an operation for supporting reliable communications according to a predetermined pattern in the self-organization area of the first part in step 1007. The operation that the MS can perform in the self-organization area includes measuring interference from BSs other than the serving BS and receiving advertisement information from a BS other than the serving BS. The MS selectively performs at least one of the above operations in every superframe according to the predetermined pattern. A signal received in the self-organization area has a longer CP or guard interval than other signals transmitted in the first part.

In step 1009, the MS determines whether it is time to use the second part of the superframe. Since the position and distribution of the second part are preset according to system setting, the determination is made by checking a relative time difference from the start of the superframe.

When it is time to use the second part, the MS processes and configures a signal according to design parameters about the second part detected in step 1005 and conducts communications accordingly in step 1011. A party with which the communications are conducted can be a BS, an RS, or another MS. If the MS communicates with a BS using a plurality of FAs, it communicates with the BS in at least one of the FAs. Herein, the design parameters include a CP length, a pilot pattern, etc. To be more specific, the MS conducts the communications by MAP message reception, transmission and reception of data signals, and transmission and reception of control messages. If the MS has measured interference in step 1007, it transmits measured interference information to the BS.

In step 1013, the BS determines whether the superframe has ended. If the superframe has not ended, the MS returns to step 1009.

In the exemplary embodiment of the present invention described with reference to FIGS. 9 and 10, the self-organization area is positioned in the first part of the superframe. It can be further contemplated as another exemplary embodiment of the present invention that the functions of the self-organization area can be performed in an area other than the first part of the superframe, that is, the self-organization area 330 can reside outside the first part.

As is apparent from the above description, the present invention advantageously supports cells with different characteristics by applying physical signal configurations optimized for different communication environments and transmitting the physical signal configuration information using a system common signal structure in a broadband wireless communication system.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. For use in a base station, an operation method for communicating in a frame divided into a first part comprising a system common signal structure and a second part comprising a communication environment-dependent signal structure in a wireless communication system in which cells co-exist under different communication environments, the operation method comprising:

generating physical configuration information about a signal associated with the second part;

transmitting the physical configuration information about the signal associated with the second part in the first part;

conducting communications by processing signals transmitted and received in the second part according to the physical configuration information; and acquiring a synchronization with a neighbor base station using a synchronization signal received in a self-organization area of the first part from the neighbor base station, wherein the synchronization signal has one of a cyclic prefix and a guard interval that are longer than a cyclic prefix of a signal transmitted in an area other than the self-organization area in the first part, wherein the different communication environments are caused by different types of base stations, and wherein the second part is used by the different types of base stations.

2. The operation method of claim 1, wherein the physical configuration information is one of a design parameter values and an identifier (ID) indicating a combination of the design parameter values, and the design parameter values include at least one of a cyclic prefix (CP) length and a pilot pattern.

3. The operation method of claim 1, further comprising: transmitting in the first part at least one of the number of groups of lower frames formed according to the physical signal configuration information, one or more indexes of lower frames in each group, a design parameter information about each group, and an information about a position of an area for supporting a mobile station (MS) that is inoperable to receive information transmitted in the first part.

4. The operation method of claim 1, further comprising: transmitting a second synchronization signal for synchronization acquisition of the neighbor base station in the self-organization area of the first part, wherein the second synchronization signal has one of a cyclic prefix and a guard interval that are longer than a cyclic prefix of a signal transmitted in an area other than the self-organization area in the first part.

5. The operation method of claim 1, further comprising:
generating an interference measurement signal having an amplitude variable along a frequency axis in proportion to an average transmit power of each frequency band; and
transmitting the interference measurement signal in a self-organization area of the first part.

6. The operation method of claim 5, wherein the interference measurement signal occupies part of a total communication band.

7. For use in a mobile station, an operation method for communicating in a frame divided into a first part comprising a system common signal structure and a second part comprising a communication environment-dependent signal structure in a wireless communication system in which cells co-exist under different communication environments, the operation method comprising:
detecting physical configuration information about a signal associated with the second part from the first part; and
conducting communications by processing signals transmitted and received in the second part according to the physical configuration information,
wherein the different communication environments are caused by different types of base stations,
wherein the second part is used by the base stations,
wherein at least one base station of the base stations acquires a synchronization with a neighbor base station using a synchronization signal received in a self-organization area of the first part from the neighbor base station, and
wherein the synchronization signal has one of a cyclic prefix and a guard interval that are longer than a cyclic prefix of a signal transmitted in an area other than the self-organization area in the first part.

8. The operation method of claim 7, wherein the physical configuration information is one of design parameter values and an identifier (ID) indicating a combination of a design parameter values, and the design parameter values include at least one of a cyclic prefix (CP) length and a pilot pattern.

9. The operation method of claim 7, further comprising:
receiving in the first part at least one of the number of groups of lower frames formed according to the physical signal configuration information, one or more indexes of lower frames in each group, a design parameter information about each group, and an information about a position of an area for supporting a mobile station (MS) that is inoperable to receive information transmitted in the first part.

10. An apparatus of a base station (BS) for communicating in a frame divided into a first part comprising a system common signal structure and a second part comprising a communication environment-dependent signal structure in a wireless communication system in which cells co-exist under different communication environments, the apparatus comprising:
a system information generator configured to generate a physical configuration information about a signal associated with the second part;
a communication module configured to transmit the physical configuration information about the signal associated with the second part in the first part and conduct communications by processing signals transmitted and received in the second part according to the physical configuration information; and
a neighbor cell synchronization manager configured to acquire a synchronization with a neighbor base station using a synchronization signal received in a self-organization area of the first part from the neighbor base station,
wherein the synchronization signal has one of a cyclic prefix and a guard interval that are longer than a cyclic prefix of a signal transmitted in an area other than the self-organization area in the first part,
wherein the different communication environments are caused by different types of base stations, and
wherein the second part is used by the different types of base stations.

11. The apparatus of claim 10, wherein the physical configuration information is one of a design parameter values and an identifier (ID) indicating a combination of the design parameter values, and the design parameter values include at least one of a cyclic prefix (CP) length and a pilot pattern.

12. The apparatus of claim 10, wherein the communication module transmits in the first part at least one of the number of groups of lower frames formed according to the physical signal configuration information, one or more indexes of lower frames in each group, a design parameter information about each group, and an information about a position of an area for supporting a mobile station (MS) that is inoperable to receive information transmitted in the first part.

13. The apparatus of claim 10, wherein the neighbor cell synchronization manager is further configured to generate a second synchronization signal for synchronization acquisition of the neighbor base station in the self-organization area of the first part, wherein the second synchronization signal has one of a cyclic prefix and a guard interval that are longer than a cyclic prefix of a signal transmitted in an area other than the self-organization area in the first part.

14. The apparatus of claim 10, further comprising a neighbor cell interference manager for generating an interference measurement signal having an amplitude variable along a frequency axis in proportion to an average transmit power of each frequency band, wherein the communication module transmits the interference measurement signal in a self-organization area of the first part.

15. The apparatus of claim 14, wherein the interference measurement signal occupies part of a total communication band.

16. An apparatus of a mobile station (MS) for communicating in a frame divided into a first part comprising a system common signal structure and a second part comprising a communication environment-dependent signal structure in a wireless communication system in which cells co-exist under different communication environments, the apparatus comprising:

a system information detector configured to detect a physical configuration information about a signal associated with the second part from the first part; and a communication module configured to conduct communications by processing signals transmitted and received in the second part according to the physical configuration information, wherein the different communication environments are caused by different types of base stations, wherein the second part is used by the base stations, wherein at least one base station of the base stations acquires a synchronization with a neighbor base station using a synchronization signal received in a self-organization area of the first part from the neighbor base station, and wherein the synchronization signal has one of a cyclic prefix and a guard interval that are longer than a cyclic prefix of a signal transmitted in an area other than the self-organization area in the first part.

17. The apparatus of claim 16, wherein the physical configuration information is one of a design parameter values and an identifier (ID) indicating a combination of the design parameter values, and the design parameter values include at least one of a cyclic prefix (CP) length and a pilot pattern.

18. The apparatus of claim 16, wherein the system information detector receives in the first part at least one of the number of groups of lower frames formed according to the physical signal configuration information received in the first part, one or more indexes of lower frames in each group, a design parameter information about each group, and an information about a position of an area for supporting a mobile station (MS) that is inoperable to receive information transmitted in the first part.

19. A wireless communication system having cells under different communication environments and using a frame divided into a first part comprising a system common signal structure and a second part comprising a communication environment-dependent signal structure, the wireless communication system comprising:

a first base station configured to transmit physical configuration information about a signal associated with the second part in the first part, and conduct communications by processing signals transmitted and received in the second part according to a signal structure corresponding to a communication environment of the first base station;

a second base station configured to transmit physical configuration information about a signal associated with the second part in the first part, and conduct communications by processing signals transmitted by and received in the second part according to a signal structure different from the signal structure of the first base station; and a first mobile station configured to detect the physical configuration information about a signal associated with the second part of the second base station from the first part and communicate with the second base station by processing a signal according to the detected physical configuration information, wherein the different communication environments are caused by different types of base stations, wherein the second part is used by the base stations including the first base station and the second base station, wherein the second base station acquires a synchronization with the first base station using a synchronization signal received in a self-organization area of the first part from the first base station, and wherein the synchronization signal has one of a cyclic prefix and a guard interval that are longer than a cyclic prefix of a signal transmitted in an area other than the self-organization area in the first part.

20. The wireless communication system of claim 19, further comprising:

a relay station (RS) for transmitting a physical configuration information about the second part having a communication environment-dependent signal structure in the first part and relaying between a second mobile station and a serving base station of the second mobile station; and the second mobile station for detecting the physical configuration information about the second part of the relay station and communicating with the relay station by processing a signal according to the detected physical configuration information.

21. The wireless communication system of claim 19, further comprising:

a third mobile station for detecting a physical configuration information about the second part of a serving base station in the first part and conducting Peer-to-Peer (P2P) communications by processing a signal according to the detected physical configuration information.

22. The wireless communication system of claim 19, wherein the first mobile station detects a physical signal configuration information about signals corresponding to a plurality of frequency allocations (FAs) used by the serving base station in the second part from the first part and communicating with the second base station in at least one of the frequency allocations by processing a signal according to the detected physical configuration information.

* * * * *